3,345,315
CHLORINATED POLYETHYLENE CROSS-LINKED WITH A POLYAMIDE

Oliver A. Barton, Florham Park, and William R. Bingham, Wayne, N.J., assignors to Allied Chemical Corporation, New York, N.Y., a corporation of New York
No Drawing. Filed Aug. 13, 1964, Ser. No. 389,492
8 Claims. (Cl. 260—23)

This invention relates to novel elastomers formed from chlorinated polyethylene. More particularly, this invention relates to elastomers which are prepared by compounding chlorinated polyethylene with a material which serves both as a curing and a plasticizing agent.

The chlorinated polymers of ethylene are of interest as relatively low cost materials, which can be readily prepared by the addition of chlorine to the ethylene polymer structure. The chlorination of ethylene polymers results in a wide variety of materials of different characteristics, depending on several factors such as the structure, molecular weight, and nature of the basic polyethylene and the amount and distribution of the added chlorine. Heretofore, it has been discovered that certain types of chlorinated polyethylene possess properties such that they can be cured to give highly useful elastomeric materials.

In copending United States patent application No. 362,175, filed Apr. 23, 1964, there is disclosed forming elastomeric materials by curing a polyethylene, which has been prepared by chlorinating linear high density polyethylene of 700,000 to 5 million molecular weight to a chlorine content of 20–45%. The curing agents preferably employed in the procedure of this patent application include peroxides and poly-functional aromatic and aliphatic amines. While the elastomers produced by this method are highly useful, several problems have been encountered in conventional practice. In particular, as the molecular weight and viscosity of the chlorinated polyethylene increase, it becomes more and more difficult to process the elastomeric compound prior to curing, and the cured products become increasingly less extensible. Thus, it has been found that higher molecular weight chlorinated polyethylenes corresponding to an intrinsic viscosity of about 3.5 and higher, as measured in o-dichlorobenzene at 100° C., cannot be compounded with the curing agents of patent application 362,175 using conventional rubber processing equipment, and further, the cured products obtained from high molecular weight material are not sufficiently extensible for some applications. Attempts have been made to overcome these problems by the addition of a plasticizer prior to or simultaneously with the incorporation of the curing agent into the polymer. While this procedure lowers the viscosity of the compound and makes it more workable, the plasticizer migrates out of the polymer with aging, presenting the problems of stiffening and deterioration of the elastomer and damage to other materials in close proximity which are soluble in the plasticizer.

It is, therefore, an object of the present invention to provide a chlorinated polyethylene composition that can be cured to form an elastomeric material and that contains a plasticizing agent, which is permanently retained by said elastomer.

A further object of this invention is to provide a chlorinated polyethylene composition containing a plasticizer which can be crosslinked into a cured elastomeric material prepared therefrom.

Another object of this invention is to provide a composition containing chlorinated polyethylene and a material which serves both as a curing agent and a plasticizer.

Additional objects and advantages of this invention will become apparent from the following detailed description thereof.

In accordance with the present invention, it has been found that certain chlorinated polymers of ethylene can be cured with a particular class of polyamides to form elastomers of excellent properties, the elastomers of this invention being produced from compositions containing (A) chlorinated polyethylene having a chlorine content of about 20–45% by weight, preferably 28–42%, crystallinity of less than about 1%, as determined by differential thermal analysis and an intrinsic viscosity of from about 1.0 to about 6.0, preferably 2.5 to 5.0, in o-dichlorobenzene at 100° C., said chlorinated polyethylene being derived by chlorination of a linear high density polymer of ethylene having an average molecular weight of about 100,000 to about 5 million, preferably of about 700,000 to 3,500,000; and (B) about 10 to 40 parts per 100 parts of chlorinated polyethylene of a polyamide condensation product of a dimerized drying oil acid and an aliphatic diamine, said polyamide containing free amino groups giving it an amine value between 50 and 250. The polyamide curing agents also serve as a plasticizer as evidenced by the decreased Mooney viscosity of the composition prior to curing and the increased extensibility of the elastomer after curing in comparison with elastomeric compositions containing the curing agents described in copending application 362,175 such as hexamethylenediamine. Since the polyamides are crosslinked into the system, there is no loss of this material with aging.

The plasticizing effect of the above-described polyamides is of particular value when a high molecular weight chlorinated polyethylene, having an intrinsic viscosity of 3.5 or higher, is employed. Compositions containing such chlorinated polyethylenes are too viscous to be satisfactorily processed on conventional rubber processing equipment such as rubber mills without the addition of a plasticizer. As a general rule, the Mooney viscosity determined in accordance with ASTM test 1646–41 on a compound containing chlorinated polyethylene and curing agent but no filler or other additive should not exceed about 60 if the composition is to be processed on conventional rubber processing apparatus. While such a low viscosity can be obtained by admixing the polyamides of this invention with high molecular weight polyethylene, the Mooney viscosity of compounds containing high molecular weight chlorinated polyethylene and curing agents such as hexamethylene-diamine exceed this viscosity even when a large excess of curing agent is used. The compositions of this invention can be readily cured under pressure at moderate temperatures to form elastomers possessing an excellent combination of properties including tensile strength, elongation, elastic modulus, hardness, hot tear strength, and resistance to aging, making the compositions particularly suitable for the molding and production of a variety of rubber products.

The chlorinated polyethylenes employed in the compositions of the invention are derived by chlorination of a substantially linear high density polyethylene which has a molecular weight of about 100,000 up to about 5 million, preferably about 700,000 up to about 3.5 million. Suitable linear high molecular weight polyethylene is produced as described in British Patent 858,674, of June 11, 1961, to Allied Chemical Corporation, by gas phase polymerization of anhydrous, oxygen-free ethylene below the softening point of the polyethylene over a porous, frangible catalyst of an inorganic compound of chromium and oxygen and active metal alkyl on a support of the group consisting of silica and silica-alumina. The polyethylenes produced thereby contain residue of the chromium-silica catalyst systems dispersed throughout the polyethylene in an amount of at least about 0.001% usually 0.001–0.002% by weight. The chromium-silica catalyst material added during polymerization is retained in the polyethylene during chlorination and contributes to the properties of the chlorinated polyethylene employed in the elastomeric compositions produced therefrom. Prior to chlorination, the polyethylene from which the chlorinated polyethylene is derived has a density between about 0.935 and about 0.985 and a crystallinity of at least 75%, and customarily in the range of 75 to 85%, as determined, for example, by differential thermal analysis. The polyethylenes produced by British Patent 858,674 have average molecular weights of about 500,000 to 5 million, generally between 1.0 to 3.5 million, as calculated according to the method of P. S. Francis et al. from the intrinsic viscosities of solutions of the polymer in decalin at 135° C. using the equation:

$$[n] = 6.77 \times 10^{-4} M^{0.67}$$

where $[n]$ = intrinsic viscosity
$M$ = average molecular weight (J. Polymer Science, vol. 31, pp. 453–466, September 1958.) As described in Example 6 of British Patent 858,674, the molecular weight of the polyethylene can be reduced by thermal treatment to a value as low as about 100,000.

The chlorinated polyethylenes employed in this invention are also characterized by having less than 1% crystallinity, desirably 0% crystallinity, as determined by differential thermal analysis. Chlorinated polyethylenes having chlorine contents of 20–45% and crystallinities of less than 1% can be prepared by a number of methods including the well-known solution chlorination procedures.

When the molecular weight of the polyethylene is 500,000 or higher, a particularly advantageous chlorination procedure is accomplished by a two-stage suspension chlorination with the first stage being carried out in aqueous slurry at temperatures below the crystalline melting point of the ethylene polymer, preferably at a temperature of about 60° to 130° C., desirably at 90° to 110° C., until at least about 5%, preferably about 10%, of chlorine has been introduced into the polymer. In the second stage, the chlorination is continued in the aqueous slurry at a temperature maintained above the crystalline melting point of the polymer, but below the softening point of the chlorinated outer coating thereof until the desired chlorine is added. Second-stage chlorination temperatures are of the order of at least about 135° C., and preferably lie in the range of about 135° to 150° C. If desired, chlorination in the second stage may be carried out at a temperature above the crystalline melting point of the polymer for a time sufficient to add at least about 5% chlorine by weight, preferably until at least a total of 25% chlorine is added to the polymer, and the chlorination then continued at a lower temperature, e.g., 110° to 120° C., until the desired total chlorine is added. The chlorination procedure is described in greater detail in French Patent 1,316,044 of Dec. 17, 1962, to Allied Chemical Corporation.

When the molecular weight of the linear polyethylene is less than 500,000, a particularly advantageous chlorination procedure is described in copending United States application 354,345, filed Mar. 24, 1964. This process comprises first forming an aqueous slurry of chlorinated polyethylene by contacting particles of polyethylene with chlorine at an hourly chlorine feed rate of not more than 5 lbs./lb. of polyethylene and at a temperature of 100° to 120° C. in aqueous slurry having solids content of not more than 20% by weight. The temperature of the resulting slurry is then raised to the upper limit of the melt range of the polyethylene, but not above 145° C., and then the chlorinated polyethylene is further reacted with chlorine in an aqueous solution to tip said polyethylene with from 1% to 15% by weight of chemically combined chlorine.

The polyamides used to cure and plasticize the chlorinated polyethylenes, according to the present invention, are prepared from dibasic acids (or mixture of dibasic acids) obtained by heating and dimerizing the unsaturated long chain acids primarily containing 16 to 22 carbon atoms which are conveniently derived from drying and semi-drying oils such as soybean, corn, linseed, tung, and perilla oils. These dimers are heated with an excess of an aliphatic primary diamine preferably containing 2 to 6 carbon atoms such as ethylene diamine, hexamethylenediamine, and tetramethylene diamine, so that the final product has the general formula $$H_2N-R-NH(CO-R'-CONH-R-NH)_nH$$

in which R is the divalent aliphatic radical corresponding to the diamine used, R' is the divalent aliphatic radical of the dibasic acid, and $n$ is a small whole number usually less than 6. The preparation and structures of these compounds is discussed in U.S. Patents 2,379,413 issued July 3, 1945, and 2,450,940 issued Oct. 12, 1948. These products are, in general, tacky resins or very viscous liquids, and are usually mixtures of two or more compounds of the above formula, characterized chemically by their amine value, which is defined as the number of milligrams of potassium hydroxide equivalent to one gram of resin. Thus, the higher the amine value, the lower is the average molecular weight. It is assumed that only the terminal —$NH_2$ groups contribute to the amine value. The amine value, divided by 56, gives the number of milliequivalents corresponding to one gram of the polyamide.

The elastomers of the present invention can be prepared by suitable heat curing of a mixture of 100 parts by weight of the above-described polyamide. Curing is generally carried out in the temperature range of 100° to 200° C. under a pressure of about 50 to 1000 p.s.i. Fillers can be added to the composition prior to curing to act as reinforcing agents and/or to reduce the price of the elastomer. Such fillers include carbon black, hydrated silica, titanium dioxide, magnesium silicate, aluminum silicate, calcium carbonate, magnesium carbonate, calcium sulfate, iron oxides, barium sulfate, asbestos, and synthetic and animal fibers. Additionally, heat stabilizers for the chlorinated polyethylene can be added to the compound prior to curing. Effective heat stabilizers include organic complexes and salts of barium, cadmium, tin, zinc, and sodium. The elastomer-forming compositions can be prepared on standard compounding equipment such as an ordinary two-roll rubber mill. During preparation, care should be taken to maintain the components as cool as possible on the mill to prevent excessive heat buildup. Compound temperatures are preferably regulated below about 100° C., and desirably in the range of about 50°–80° C. In preparing the elastomer-forming compositions, it is preferable to first add the heat stabilizers, fillers, etc., and, after additional mixing, the curing system, including vulcanizing agents and accelerators, is added followed by thorough working to insure good mixing. The resulting composition can be molded or extruded and then cured at elevated temperatures and pressures to form various products such as gaskets, hose, footwear, belting, and container linings.

The following examples are given to further illustrate the invention, but it is to be understood that the invention is not to be limited in any way by the details described therein.

In the examples, the amount of crosslinked product, or gel, formed as a result of the vulcanizing process was determined in accordance with the following procedure. About 0.2 to 0.3 gram of the treated polymer was weighed into a tared, stainless steel basket made of 250-mesh screen. The basket was placed into a Soxhlet extractor containing approximately 125 ml. of monochlorobenzene and refluxed for 6 hours. The noncrosslinked product was extracted, permitting gravimetric determination of the crosslinked gel. During the extraction the system was kept under slow nitrogen stream to prevent oxidation.

Example 1

Chlorinated polyethylene, having a chlorine content of 40% by weight and an intrinsic viscosity of about 4.0 in o-dichlorobenzene at 100° C., was prepared by aqueous slurry chlorination of a high density linear polyethylene which had been prepared in accordance with the process of British Patent 858,674 and which had a molecular weight of 1.2 million and a density of about 0.94. Chlorination was carried out in a first stage at a temperature of about 100° C. until 10% chlorine was added to the polyethylene, followed by a second-stage chlorination at a temperature of 140° C. until a total of 40% chlorine was added. The chlorinated polyethylene obtained had a glass transition temperature of −12° C. and less than 1% crystallinity as determined by differential thermal analysis. The Mooney viscosity of the chlorinated polyethylene, as determined in accordance with ASTM test 1646–41, was 113.

To illustrate the present invention, portions of the above chlorinated polyethylene were mixed on a rubber mill with a series of polyamides and uniformly dispersed therewith. The polyamides were Versamid 100, Versamid 115, and Versamid 140, which are essentially the condensation products of the dimer of linoleic acid with ethylene diamine. The characteristics of these polyamides are given in Table I.

TABLE I

|  | Versamid 100 | Verasmid 115 | Versamid 140 |
|---|---|---|---|
| Amine Value [1] | 89–93 | 210–220 | 350–400 |
| Viscosity, poises −40° C [2] |  | 500–750 |  |
| Viscosity, poises −150° C. [2] | 7–12 |  |  |
| Viscosity, poises −75° C. |  | 31–38 | 2–6 |
| Specific gravity | 0.98 | 0.99 | 0.97 |
| Softening point [3] | 45–53 | ([4]) | Fluid |

[1] The amine value is the milligrams of KOH equivalent to the base content of 1 gram of resin as determined by titration with HCl.
[2] Brookfield viscometer.
[3] ASTM E-28-51T.
[4] Viscous fluid.

Additionally, as a comparison, two portions of the chlorinated polyethylene were mixed in the manner described with different amounts of hexamethylenediamine. The resulting compounds were formed into sheets .075" thick, which were cut into four 4" x 4" slabs. The Mooney viscosity was determined on the slabs after which they were cured in a press at a pressure of 500 p.s.i. and a temperature of 160° C. The composition of each sample, the Mooney viscosity before curing, and the physical properties after curing, are given in Table II.

Example 2

The chlorinated polyethylene was derived from polyethylene which had an intrinsic viscosity of about 1.95 dl./gm. in decalin at 135° C., a density of 0.94 gram per liter, a melt index of about 0.2 gram per 10 minutes, and an average molecular weight of about 130,000. Chlorination was initiated at 100° C. at a rate of 0.2 pound of chlorine per pound of polyethylene per hour. The temperature of the reaction mixture was then increased, maintaining the same rate of chlorination throughout, to 115° C., at which time 10% by weight of chlorine had been introduced into the polymer. Chlorination was continued at 115° C. until the chlorine content of the polymer was 34%. The temperature was then increased to 140° C., during which period the chlorine content of the polymer reached 36%. The product was next tipped with chlorine at 140° C. until the product contained 40% by weight of chlorine. The recovered product had an intrinsic viscosity of 1.4 as measured in o-dichlorobenzene at 100° C., a glass transition temperature of −17° C. and substantially zero crystallinity.

To 100 parts by weight of the above chlorinated polyethylene were added 20 parts of Versamid 140 as in the procedure of Example 1, and the resultant product was cured at 160° C. for 30 minutes at about 500 p.s.i. The results of testing are summarized in Table III.

Example 3

The chlorinated polyethylene was derived from the linear high molecular weight polyethylene described in Example 1 above. Chlorination was initiated at 100° C. and the temperature allowed to rise to 115° C., at which time about 10% by weight of chlorine had been added. Chlorination was continued at 115° C. until about 17% by weight of chlorine was added. The temperature was then increased to 140° C., at which time about 23% chlorine had been added and the temperature was maintained at 140° C. until 30% by weight of chlorine had been added to the polymer. The resultant product had an intrinsic viscosity of 4.12, a glass transition temperature of −20° C., and less than 1% crystallinity.

To 100 parts of the above chlorinated polyethylene, 20 parts by weight of Versamid 140 were added using the procedure of Example 1. The test results are summarized in Table III.

TABLE II

| Vulcanizing Agent or Filler | Parts by Weight to 100 Parts of Chlorinated Polyethylene | | | | | | | | |
|---|---|---|---|---|---|---|---|---|---|
| Versamid 140 | 20 |  |  |  | 10 | 10 | 5 |  |  |
| Versamid 115 |  | 40 | 20 |  | 10 | 5 | 5 |  |  |
| Versamid 100 |  |  |  | 40 |  |  |  |  |  |
| Hexamethylenediamine |  |  |  |  |  |  |  | 10 | 20 |
| Mooney Viscosity [1] | 39 | 21 | 29 | 33 | 33 | 43 | 62 | 121 | 78 |

| Tests | Physical Properties (Cured at 160° C. for 30 Minutes) | | | | | | | | |
|---|---|---|---|---|---|---|---|---|---|
| Hardness, Initial [2] | 74 |  |  |  | 72 | 70 |  | 62.5 | 68 |
| Hardness, 15 sec. [2] | 63 | 45 | 49 | 37 | 60 | 57 | 45 | 58 | 63 |
| Ultimate Tensile Strength, p.s.i. [3] | 1,501 | 875 | 1,365 | 1,070 | 1,632 | 1,775 | 1,425 | 1,210 | 1,140 |
| Ultimate Elongation, percent [3] | 342 | 435 | 550 | 650 | 406 | 458 | 550 | 240 | 180 |
| Tensile Modulus, 100% [3] | 237 | 155 | 185 | 150 | 165 | 166 | 130 | 140 | 280 |
| Tensile Modulus, 200% [3] | 402 | 180 | 195 | 150 | 236 | 231 | 165 | 610 | ([4]) |
| Tensile Modulus, 300% [3] | 985 | 305 | 255 | 220 | 489 | 388 | 220 | ([4]) | ([4]) |
| Gel, percent | 94 | 88 | 89 | 72 | 91 | 90 | 68 | 74 | 74 |
| Set at Break, percent [3] | 10 | 12 | 22 | 23 | 10 | 13 | 18 | 5 | 3 |
| Weight loss at 150° C. for 17 hrs., percent | 3.5 |  |  |  | 3.2 | 2.6 |  |  |  |
| Tear Resistance [5] |  |  |  |  | 83 | 86 |  |  |  |

[1] ASTM Test 1646–41.
[2] ASTM Test D676 using Shore A-2 type Durometer.
[3] ASTM Test D412–62T.
[4] Specimen ruptured before stated elongation reached.
[5] ASTM Test D1004–61.

TABLE III

| Tests[1] | Physical Properties Cured at 160° C. for 30 Minutes | |
|---|---|---|
| | Example 2 | Example 3 |
| Hardness, Initial | 75 | 85 |
| Hardness, 15 Sec | 64 | 81 |
| Ultimate Tensile Strength, p.s.i. | 1,402 | 1,444 |
| Ultimate Elongation, Percent | 354 | 300 |
| Tensile Modulus, 100% | 253 | 467 |
| Tensile Modulus, 200% | 498 | 766 |
| Tensile Modulus, 300% | 952 | 1,423 |
| Gel, Percent | 86 | 94 |
| Set at Break, Percent | 19 | 68 |
| Weight Loss at 150° C. for 15 hrs., Percent | 3.6 | 1.9 |
| Tear resistance | 97 | 196 |

[1] Same test procedures as set forth in Table II.

It will be apparent that many modifications and variations may be effected without departing from the scope of the novel conceptions of the present invention and the illustrative details disclosed are not to be construed as imposing undue limitations on the invention.

We claim:

1. A heat curable composition comprising (A) 100 parts by weight of chlorinated polyethylene having a chlorine content of about 20-45% by weight and an intrinsic viscosity of from about 1.0 to 6.0 in o-dichlorobenzene at 100° C., said chlorinated polyethylene being prepared by chlorinating a linear high density polyethylene having an average molecular weight of about 100,000 to 5 million; and (B) about 10 to 40 parts by weight of a polyamide condensation product of a dimerized drying oil acid and an aliphatic diamine, said polyamide containing free amine groups and having an amine value of from 50 to 250.

2. The composition of claim 1 wherein said chlorinated polyethylene has a crystallinity of less than 1% and an intrinsic viscosity of about 2.5 to 5.0 in o-dichlorobenzene at 100° C. and is prepared by the chlorination of linear high density polyethylene having a molecular weight of at least 700,000.

3. The composition of claim 1 wherein said chlorinated polyethylene has a chlorine content of about 28 to 42% by weight.

4. The composition of claim 1 in which the linear high density polyethylene is prepared by gas phase polymerization of ethylene below the softening point of the polyethylene and contains at least about .001% by weight of polymerization catalyst comprising chromium and material selected from the group consisting of silica and silica-alumina dispersed throughout said ethylene.

5. The composition of claim 1 wherein said polyamide is essentially a condensation product of the dimer of linoleic acid with ethylene diamine.

6. An elastomeric material obtained by curing the composition of claim 1 at a temperature of about 100° to 200° C.

7. A process for the preparation of heat curable composition comprising admixing 100 parts by weight of chlorinated polyethylene having a chlorine content of about 20-45% by weight and an intrinsic viscosity of from about 1.0 to 6.0 in o-dichlorobenzene at 100° C., said chlorinated polyethylene being prepared by chlorinating a linear high density polyethylene having an average molecular weight of about 100,000 to 5 million, and 10 to 40 parts by weight of a polyamide condensation product of a dimerized drying oil acid and an aliphatic diamine, said polyamide containing free amine groups and having an amine value of from 50 to 250.

8. A process for the preparation of an elastomeric material comprising admixing 100 parts by weight of chlorinated polyethylene having a chlorine content of about 20-45% by weight and an intrinsic viscosity of from about 1.0 to 6.0 in o-dichlorobenzene at 100° C., said chlorinated polyethylene being prepared by chlorinating a linear high density polyethylene having an average molecular weight of about 100,000 to 5 million, and 10 to 40 parts by weight of a polyamide condensation product of a dimerized drying oil acid and an aliphatic diamine, said polyamide containing free amine groups and having an amine value of from 50 to 250, and heating the resulting composition at a temperature of 100° to 200° C. until said composition is substantially cured.

References Cited

UNITED STATES PATENTS

| 2,467,550 | 4/1949 | Fletcher et al. | 260—23 |
| 2,851,735 | 9/1958 | Hogg et al. | 260—23 |
| 2,914,496 | 11/1959 | Kelly | 260—23 |
| 3,244,774 | 4/1966 | Kaupp | 260—897 |
| 3,283,031 | 11/1066 | Greene et al. | 260—859 |

FOREIGN PATENTS

| 858,674 | 6/1961 | Great Britain. |

DONALD E. CZAJA, *Primary Examiner.*

L. J. BERCOVITZ, *Examiner.*

V. P. HOKE, R. A. WHITE, *Assistant Examiners.*